US010666771B2

(12) United States Patent
Chan et al.

(10) Patent No.: US 10,666,771 B2
(45) Date of Patent: May 26, 2020

(54) METHOD AND SYSTEM FOR ALLOWING THE USE OF DOMAIN NAME BASED NETWORK POLICIES STORED IN A SECOND DEVICE IN ENFORCING NETWORK POLICY AT A FIRST DEVICE

(71) Applicant: PISMO LABS TECHNOLOGY LIMITED, Hong Kong (HK)

(72) Inventors: Ho Ming Chan, Hong Kong (HK); Sze Hon Chan, Hong Kong (HK); Alex Wing Hong Chan, Hong Kong (HK); Kit Wai Chau, Hong Kong (HK)

(73) Assignee: PISMO LABS TECHNOLOGY LIMITED, Kowloon (HK)

( * ) Notice: Subject to any disclaimer, the term of this patent is extended or adjusted under 35 U.S.C. 154(b) by 259 days.

(21) Appl. No.: 15/180,287

(22) Filed: Jun. 13, 2016

(65) Prior Publication Data
US 2017/0359447 A1 Dec. 14, 2017

Related U.S. Application Data

(63) Continuation of application No. 13/881,726, filed on Aug. 5, 2013, now Pat. No. 9,369,345.

(51) Int. Cl.
*G06F 15/16* (2006.01)
*H04L 29/06* (2006.01)
(Continued)

(52) U.S. Cl.
CPC .............. *H04L 69/03* (2013.01); *H04L 45/20* (2013.01); *H04L 45/74* (2013.01); *H04L 45/742* (2013.01);
(Continued)

(58) Field of Classification Search
CPC ....... H04L 69/03; H04L 45/20; H04L 61/1511
(Continued)

(56) References Cited

U.S. PATENT DOCUMENTS

2001/0014103 A1* 8/2001 Burns ............... G06F 17/30902
370/429
2002/0069278 A1 6/2002 Forslow
(Continued)

FOREIGN PATENT DOCUMENTS

| CN | 1863193 A | 11/2006 |
|----|-----------|---------|
| CN | 101094129 A | 12/2007 |

(Continued)

OTHER PUBLICATIONS

International Search Report in International Application No. PCT/IB2011/055040, dated Aug. 30, 2012.
(Continued)

*Primary Examiner* — Oscar A Louie
*Assistant Examiner* — Oluwatosin M Gidado
(74) *Attorney, Agent, or Firm* — Fisherbroyles, LLP

(57) ABSTRACT

A method and a system for creating Internet Protocol address based network policies (IPPs) by using domain name based network policies (DNNTPs) is disclosed. The DNNTPs are stored in a second device, and are used for enforcing IPPs at a first device. The first device retrieves one or more DNNTPs from the second device and monitors network traffic for Domain Name System (DNS) look-up reply. When a network device receives a record Domain Name System look-up reply, the network device identifies one or more Internet Protocol addresses of one or more host names specified in the address record Domain Name System look-up reply, then determine whether the one or more host names contain a domain name used in one or more DNNTPs and create one or more IPPs.

20 Claims, 5 Drawing Sheets

(51) Int. Cl.
*H04L 29/12* (2006.01)
*H04L 12/733* (2013.01)
*H04L 12/741* (2013.01)
*H04L 12/747* (2013.01)
*H04L 12/26* (2006.01)

(52) U.S. Cl.
CPC ........ *H04L 61/1511* (2013.01); *H04L 43/028* (2013.01)

(58) Field of Classification Search
USPC .................................................. 709/221, 224
See application file for complete search history.

(56) References Cited

U.S. PATENT DOCUMENTS

| | | |
|---|---|---|
| 2002/0112083 A1 | 8/2002 | Joshi et al. |
| 2002/0112155 A1 | 8/2002 | Martherus et al. |
| 2002/0124060 A1 | 9/2002 | Jinzaki |
| 2002/0138572 A1 | 9/2002 | Delany et al. |
| 2002/0138577 A1 | 9/2002 | Teng et al. |
| 2003/0074580 A1 | 4/2003 | Knouse et al. |
| 2003/0105862 A1 | 6/2003 | Villavicencio |
| 2003/0126292 A1 | 7/2003 | Davis et al. |
| 2003/0217101 A1 | 11/2003 | Sinn |
| 2004/0010606 A1 | 1/2004 | Delaney et al. |
| 2004/0044791 A1 | 3/2004 | Pouzzner |
| 2004/0083306 A1 | 4/2004 | Gloe |
| 2005/0080791 A1 | 4/2005 | Ghatare |
| 2005/0080792 A1 | 4/2005 | Ghatare |
| 2005/0084100 A1 | 4/2005 | Spies et al. |
| 2005/0240943 A1 | 10/2005 | Smith et al. |
| 2005/0278550 A1 | 12/2005 | Mahone et al. |
| 2006/0036767 A1 | 2/2006 | Ryan |
| 2006/0098577 A1 | 5/2006 | MeLampy et al. |
| 2007/0061874 A1 | 3/2007 | Coppola et al. |
| 2008/0005127 A1 | 1/2008 | Schneider |
| 2008/0010448 A1 | 1/2008 | Sabnis et al. |
| 2008/0126292 A1 | 5/2008 | Bhogal et al. |
| 2009/0144224 A1* | 6/2009 | Phan .................... G06F 3/0613 |
| 2010/0131646 A1* | 5/2010 | Drako ............... H04L 29/12066 709/225 |
| 2010/0235144 A1 | 9/2010 | Mosberger-Tang |
| 2015/0319261 A1* | 11/2015 | Lonas ................. H04L 67/2852 709/216 |
| 2017/0288968 A1* | 10/2017 | Mentze ............... H04L 12/6418 |
| 2017/0346853 A1* | 11/2017 | Wyatt .................... H04L 43/12 |
| 2018/0013793 A1* | 1/2018 | Belamaric ............... H04L 63/20 |
| 2018/0167405 A1* | 6/2018 | Comay ............... H04L 63/1425 |

FOREIGN PATENT DOCUMENTS

| | | |
|---|---|---|
| CN | 102055813 A | 5/2010 |
| CN | 101895589 A | 11/2010 |
| WO | 2010/068462 A1 | 6/2017 |

OTHER PUBLICATIONS

Written Opinion of the international Searching Authority in International Application No. PCT/IB2011/055040, dated Aug. 30, 2012.
First Office Action in Chinese Application No. 201180069338.7, dated Dec. 23, 2015.

* cited by examiner

METHOD AND SYSTEM FOR ALLOWING THE USE OF DOMAIN NAME BASED NETWORK POLICIES STORED IN A SECOND DEVICE IN ENFORCING NETWORK POLICY AT A FIRST DEVICE

RELATED APPLICATIONS

The present application is a continuation application which claims the benefits of, and is based on, U.S. patent application Ser. No. 13/881,726 titled "METHODS AND SYSTEM FOR ALLOWING THE USE OF DOMAIN NAMES IN ENFORCING NETWORK POLICY" filed on 5 Aug. 5, 2013, now U.S. Pat. No. 9,369,345, which claims the benefits of, and is a national stage entry of, PCT Application Ser. No. PCT/IB2011/055040 titled "METHOD AND SYSTEM FOR ALLOWING THE USE OF DOMAIN NAMES IN ENFORCING NETWORK POLICY " filed on Nov. 11, 2011, the contents of which are herein incorporated by reference in their entireties.

TECHNICAL FIELD

The present invention relates to a local network interworking with an Internet Protocol (IP) network, and more particularly to a method and system for allowing the use of a domain name based network policies stored in a second device in enforcing network policy at the first device.

BACKGROUND

In order to protect network and regulate network traffic, state-of-arts network devices enforce network policy on network traffic. A network policy describes how a network device shall operate, and apply restrictions to different types of network traffic, sources, destinations and traffic content. A network policy can be created by using an Internet Protocol address or/and a domain name. The two communication methods to enforce network policies are overriding routing table used in routers and content examination by proxy server. When there are many network devices, there may be many network policies to manage and store.

A router uses a routing table to determine how to forward network traffic. The router implements an overriding routing table to override the routes established or recorded in the routing table in order to execute network policies. At a router, network policies are based on Internet Protocol (IP) address, not domain name. A router examines the IP address of a packet to check whether the IP address has been specified in the overriding routing table. If so, the packet will be routed according to the network policies stated in the overriding routing table. If not, the packet will be routed according to the routing table. The benefit of using overriding routing table is its simplicity to enforce network policies. The disadvantage of using overriding routing table is its inflexibility to use domain name to enforce network policies.

For the state-of-art routers, if a network administrator tries to have a routing policy using a domain name, the network administrator has to look up the corresponding IP address of the domain name first, and then creates a routing policy at the state-of-art router using the IP address. The possible combination of subdomain and host name is almost unlimited. This method is labour intensive and subject to human error.

A proxy server may examine contents passing through it. If the proxy server finds the contents satisfying the conditions of a routing policy after examining the contents, the proxy server then takes corresponding network traffic routing actions against the contents and network traffic, such as filtering, blocking and/or forwarding. Some common methods used for content examination include: Uniform Resource Locator (URL) or Domain Name System (DNS) blacklists, URL regex filtering, Multipurpose Internet Mail Extensions (MIME) filtering, or content keyword filtering. Some proxy servers designed for handling web traffic have been known to employ content analysis techniques to look for traits commonly used by certain types of content providers. The administrator may supply many combinations of URL, domain names, IP addresses, keywords and etc. to create network traffic routing policies. The benefits for using proxy server include the flexibility to use domain name to create network traffic routing policies. One of the disadvantages of using proxy server is the network traffic throughput limitation as proxy server in general uses more processing power and storage. Another disadvantage of using proxy server is that proxy server is application specific. For some application like Security Sockets Layer, a totally transparent proxy server is difficult to exist and may be vulnerable to man-in-the-middle attack.

Therefore, it is desirable to allow router to use domain name based network policy for routing. As one administrator may manage many routers and many domain name based network policies, domain name based network policies may be stored in a device different from the routers. However, allowing such domain name based network policy in a router by implementing how proxy server examining contents increases the complexity and computing resource requirements of a router.

PTL 0001: U.S. Pat. No. 7,984,493 (ALCATEL-LUCENT). Jul. 22, 2005.

disclosed a method and a system to detect and confine network malicious activities originating from a local host on a local network to a remote host outside of the local network using a local DNS server for receiving from the local host a request for a connection to the remote host, completing a DNS look-up to obtain the IP address of the remote host, and generating a conformity indication; and a local enforcement unit connected between the local network and the remote host, for blocking establishment of the connection by default, until it receives the conformity indication. Unlike U.S. Pat. No. 7,984,493, this invention does not require the need to have a local DNS server and does not solely provide blocking capability. Therefore U.S. Pat. No. 7,984,493 does not disclose any details for a notional person skilled in the art to carry out this invention and does not prompt a notional person skilled in the art to modify U.S. Pat. No. 7,984,493 to arrive at something falling within the terms of the claims of this invention.

PTL 0002: U.S. Pat. No. 7,743,158 (NTT DOCOMO INC.). Apr. 12, 2002.

disclosed a method and a system for a network edge, device to integrate the domain name filtering into security policy of the network edge device by using personal filter and service filter. Unlike U.S. Pat. No. 7,743,158, this invention does not use personal filter and does not involved the integration of personal filter and service filter. Therefore U.S. Pat. No. 7,743,158 does not disclose any details for a notional person skilled in the art to carry out this invention and does not prompt a notional person skilled in the art to modify U.S. Pat. No. 7,743,158 to arrive at something falling within the terms of the claims of this invention.

A domain name may be a host name if it has been assigned with an Internet host and associated with the host's IP address. A host name is a domain name that has at least one associated IP address. For example, the domain name "example.com" could also be a host name if an IP addresses is associated. The definitive descriptions of the rules for forming domain names appear in RFC 1035, RFC 1123, and RFC 2181 published by Internet Engineering Task Force.

Advantageous Effects

This invention allows the use of domain name in enforcing network policy. Therefore network administrator has more flexibility in creating network policy and does not need to manually resolve IP address when creating network policy and the network policy can be stored at a device different from the device enforcing the network policy

SUMMARY OF THE INVENTION

A method and a system for creating Internet Protocol address based network policy (IPP) by using domain name based network policies (DNNTPs) is disclosed. The DNNTPs are stored at a device different from the device enforcing the IPP. When a network device receives an record Domain Name System (DNS) look-up reply, the network device identifies one or more Internet Protocol (IP) addresses of one or more host names specified in the address record DNS look-up reply, then determine whether the one or more host names contain a domain name used in one or more domain name based network policies and create one or more IP address based network policies.

Parameters used in a (DNNTP) include one or more domain names of traffic destination, address of source traffic; protocol, and algorithm. Parameters used in an IPP include one or more IP addresses of traffic destination, address of source traffic, protocol, and algorithm. The difference between a DNNTP and its correspondence IPP is the parameter use for traffic destination such that the domain name part of a DNNTP is replaced with an IP address in IPP.

BRIEF DESCRIPTION OF DIAGRAMS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components wherein.

MODE(S) FOR CARRYING OUT THE INVENTION

Detailed Descriptions

Parameters used in a domain name based network policy (DNNTP) include address of source traffic, such as IP address, IP address range and Ethernet address; one or more domain names of traffic destination; protocol, such as transmission control protocol, user datagram protocol, and port number, and algorithm, such as weight balance, least used, and lowest latency and priority. Parameters used in an Internet Protocol address based policy (IPP) include address of source traffic, such as IP address, IP address range and Ethernet address, one or more IP addresses of traffic destination; protocol, such as transmission control protocol, user datagram protocol, and port number; and algorithm, such as weight balance, least used, and lowest latency and priority. The difference between a DNNTP and its correspondence IPP is the parameter used for traffic destination such that the domain name part of a DNNTP is replaced with an IP address in IPP.

IPP is enforced by a network device (IPPND). The DNNTPs can be stored at an IPPND or a device different from IPPND, and inputted by an administrator, received through a network, transferred through a storage medium and/or received through other known methods.

Parameters of an IPP are the same as parameters of a DNNTP except that the domain name part of the DNNTP is replaced with an IP address in IPP.

As two different host names may share the same IP address, it is possible that an IPP created according a domain name specified in a DNNTP affects network traffic belong to a different host name and results in erroneous or sub-optimal routing of network traffic.

This invention is applicable to both Internet Protocol version 4 (IPv4) network and Internet Protocol version 6 (IPv6) network. Therefore, the record type of an address record DNS look-up request is "A" type for IPv4 address record or "AAAA" type for IPv6 address record and the record type of an address record DNS look-up reply is "A" type for IPv4 address record or "AAAA" type for IPv6 address record. The IP address contained in a DNS look-up reply is either IPv4 address or IPv6 address.

Method

Figure 1:
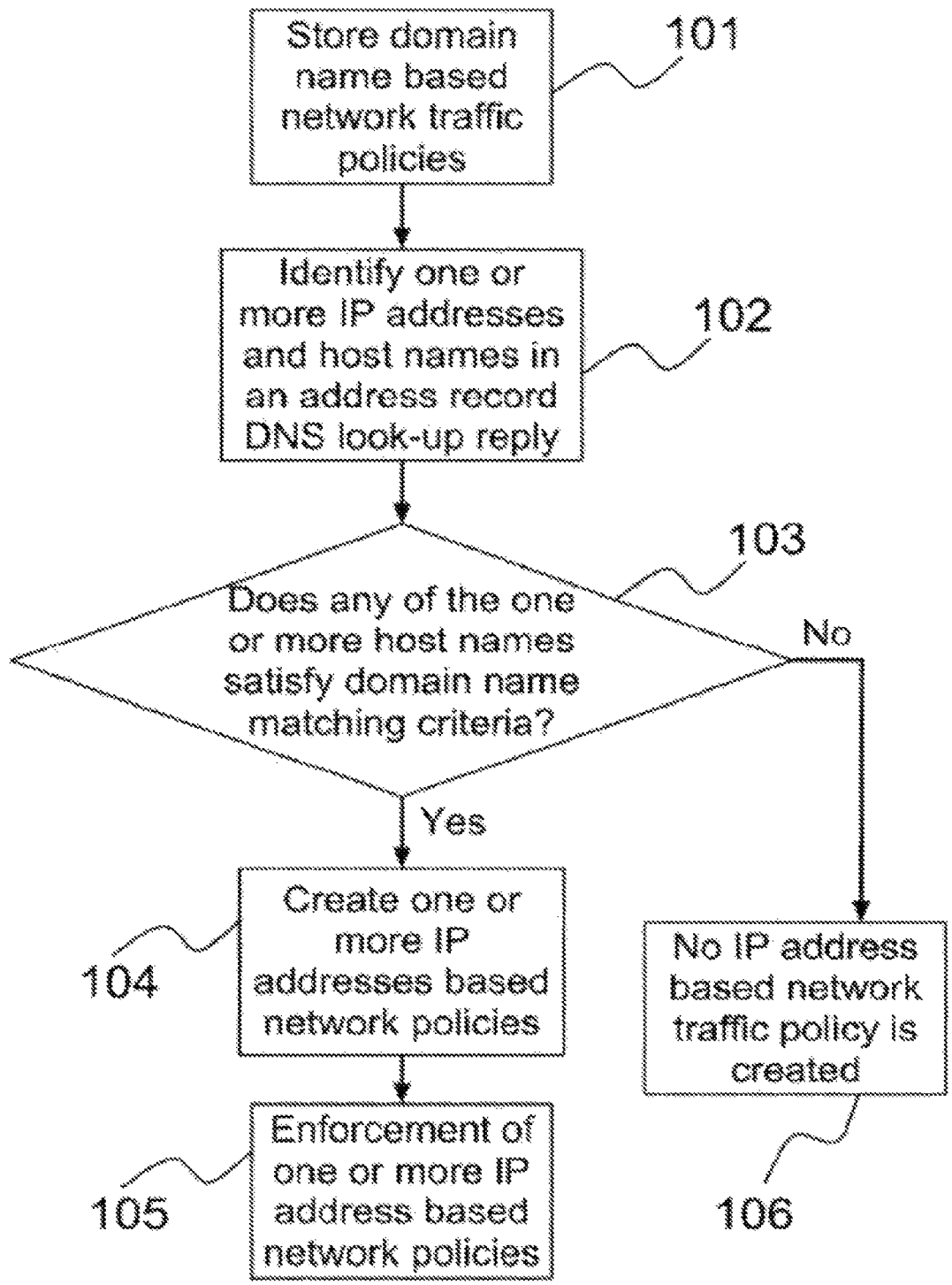
FIG. 1 is a flow chart showing the steps of creating an Internet Protocol address based network policy using a domain name.

FIG. 1 is a flow chart illustrating a method for creating one or more IPPs by using one or more DNNTPs. At functional block 101, one or more DNNTPs are stored in a memory of a device. The device can be a computing device or network device and it can be the same device or different device enforcing the IPP. The memory can be implemented using random access memory, read only memory, static memory, non-volatile memory, magnetic storage medium, optical storage medium or any storage medium.

At functional block 102, when an address record DNS look-up reply is received, one or more host name and one or more IP addresses stated in the address record DNS look-up reply are identified by examining the payload of the IP packet carrying the address record DNS look-up reply. According to one of the embodiments of the invention, the address record DNS look-up reply is received by a device different from the IPPND. According to one of the embodiments of the invention, the address record DNS look-up reply is received by the IPPND. According to one of the embodiments of the invention, the DNS look-up reply is received from a wide area network of the network device. According to one of the embodiments of the invention, the DNS look-up reply is received from a local area network of the network device. According to one of the embodiments of the invention, the examination of address record DNS look-up reply is conducted by a computing device or another network device, which then sends the identified one or more host names and one or more IP addresses to the network device.

Contrary to prior arts of proxy server, functional block 102 does not initialize DNS look-up request for obtaining the corresponding IP addresses while proxy server resolves the IP address of a domain name by issuing DNS look-up request itself. Contrary to prior arts of router, functional block 102 examines the contents of network traffic passing through in order to identify the host name and IP address.

At decision block 103, the one or more host names which are identified at functional block 102 is then compared to domain names in the DNNTPs received at functional block 101. If a host name contains one or more domain names used in one or more DNNTPs, the host name is then used for creating one or more IPPs at functional block 104. For example, host names "smtp.example.com", "www.example.com", "video.example.com", "audio.01.example.com" and "movie.europe.example.com" all contain the domain name "example.com" and if "example.com" is used in a DNNTP, the one or more IP addresses of these host names are then used for created IPPs at functional block 104. If the host name does not contain a domain name used in any of the DNNTPs, then no IPP in relation to the host name is created at functional block 106.

At functional block 104, the one or more IP address identified are used for creating one or more IPPs. For example, if a DNNTP of domain name "example.com" is to route all network traffic to domain name "example.com" through a WAN network interface and if the identified host name and IP address of an address record DNS look-up reply at function block 102 are "video.example.com" and 123.123.123.123 respectively, then are IPP to route all network through the specified WAN interface for IP address 123.123.123.123 is then created. If the identified host name and IP address of another address record DNS look-up reply at function block 102 are "mail.example.com" and 123.123.123.124 respectively, then another IPP to route all network through the specific WAN interface for IP address 123.123.123.124 is also then created. Therefore, there are two IPPs established for domain name "example.com" after the two address record DNS look-up replies are received.

The IPP is then used for performing network policy at functional block 105. When the network device receives network traffic, the network device checks whether the IP address of the network traffic matches any of the IPP stored. If so, the IPP is enforced to regulate the network traffic. It is possible that more than one IPP is created for an IP address. As a result, a priority parameter may be used to assign different priorities to different DNNTPs. The enforcement of IPP can be carried out by a device, which is composed of microprocessor, storage unit, network interface, and other electronic components that are commonly found in a network device, such as a router. It is apparent to a skilled person in the art how to implement the enforcement of IPP.

Figure 2:
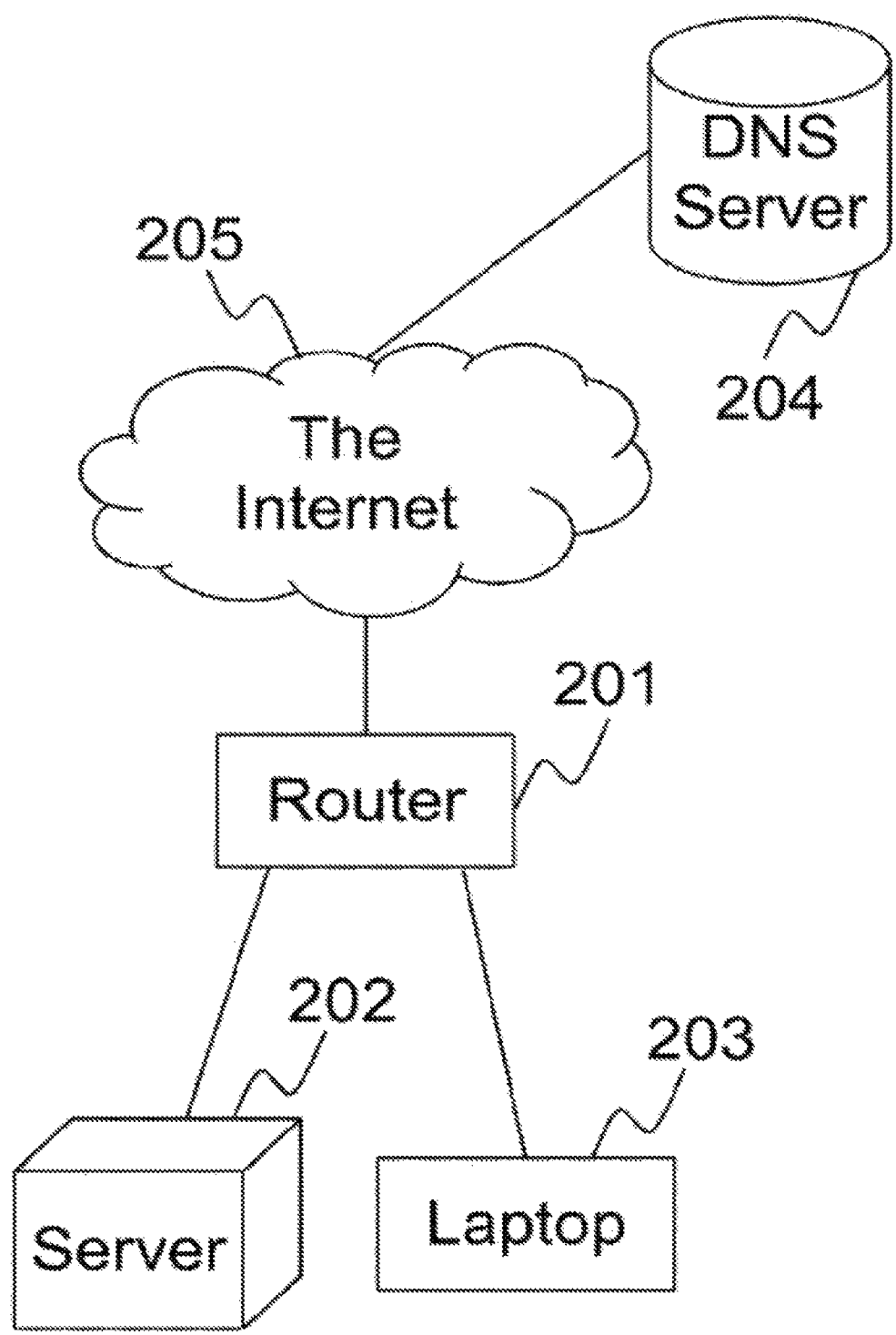
FIG. 2 is a view showing a configuration of a network as employed in the present invention.

FIG. 2 is a network architecture diagram illustrating one of the embodiments of the invention that the functional blocks and decision block in FIG. 1 can be implemented in different network devices and computing devices. Router 201 enforces IPP and mirrors address record DNS look-up reply traffic to server 202. Server 202 stores one or more DNNTPs and determines whether one or more host name contained in an address record DNS look-up reply matches one or more DNNTPs. If there is a match, server 202 will then create one or more IPPs and send those IPPs to router 202 for enforcement. Laptop 203 is the computing device tries to resolve an IP address of a host name and is connected to the LAN of router 201. DNS server 204 is located at the WAN of router 201 and can communicate with router 201 through the Internet 205.

According to one of the embodiments, the device managing IPP is different from IPPND. Therefore, the device managing IPP does not receive the same network traffic that the IPPND receives.

Figure 3:
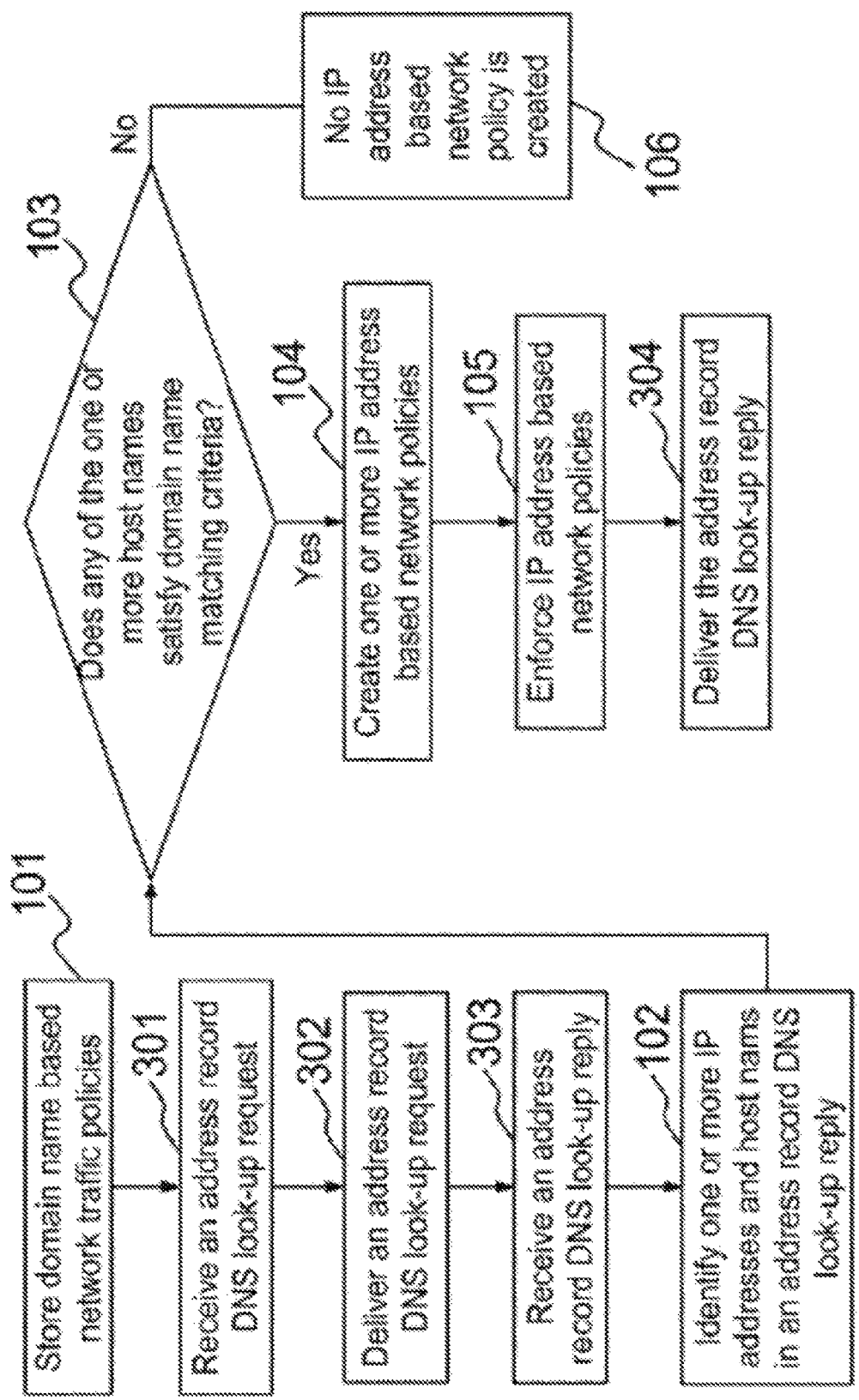
FIG. 3 is a flow chart showing the steps of creating and enforcing an Internet Protocol address based network policy using a domain name when address record DNS look-up request and DNS look-up reply are received by the same network device.

FIG. 3 illustrates one of the embodiments of the invention that a single network device uses domain name to manage the creation of an IPP and to enforce the IPP. Therefore DNS look-up reply is received and the routing of networking traffic is conducted by the same IPPND. When a network device or computing device, which is connected to the LAN of the IPPND, tries to resolve one or more IP addresses of a host name by sending out an address record DNS look-up request, the IPPND will then receive the address record DNS look-up request from one of its LAN network interfaces at functional block 301. As the IPPND cannot resolve the IP address, the IPPND then forwards the address record DNS look-up request to a DNS server or another router connected to one of the WAN interfaces of IPPND at functional block 302. When a DNS server has resolved the IP address, the DNS server replies with an address record DNS look-up reply. The IPPND will then receive the address record DNS look-up reply at functional block 303. The IPPND will then perform the steps at decision block 103, functional block 104, functional block 105, and functional block 304 if the host name of the address record DNS look-up reply contains a domain name used in one or more DNNTPs.

According to one of the embodiments of the invention, the step of delivering the address record DNS look-up reply is performed after the creation of one or more IPPs at the IPPND. If the DNS look-up request is originated from a computing device or a network device connected to the LAN of the IPPND, the computing device or the network device waits for the address record DNS look-up reply from the IPPND in order to resolve the IP address of the host name before sending out network traffic to that IP address. Therefore, the one or more IPPs should be created before the DNS look-up reply is delivered to ensure that the IPPND has adequate time to enforce one or more IPPs in relation to that domain name. If there is not adequate time for an IPP to be created for policy routing enforcement, it is possible that network traffic originated from the LAN of the IPPND has violated the one or more IPPs.

According to one of the embodiments of the invention, an IPP created is removed from the IPPND after a pre-determined period of time. A timer can be used to record the time when an IPP should be removed. Multiple timers are needed if there are multiple IPP created. A timer can be implemented by using storage medium, such random access memory, hard disk and non-volatile memory. According to one of the embodiments of the invention, the pre-determined period of time is determined by a network administrator. According to one of the embodiments of the invention, the pre-determined period of time is hard coded at the IPPND. According to one of the embodiments of the invention, the pre-determined period-of-time is determined by a value called the time to live (TTL) associated with every record in an address record DNS look-up reply. The TTL is set by the administrator of the DNS server sending out the authoritative response for a particular resource record. The TTL may vary from just seconds to days or even months. If the pre-determined period of time is too short, the IPPND may not be able to perform policy based routing stated in a DNNTP as the corresponding IPP has already been removed from the IPPND. If the pre-determined period of time is too long, the IPPND may use incorrect IP address to enforce a DNNTP as the corresponding IPP contains an outdated IP address.

According to one of the embodiments of the invention, when a new IPP which is identical to another existing IPP (Existing IPP) created earlier is created, there is no need to store the new IPP, instead, the time to remove Existing IPP is then updated according to the pre-determined period of time of removing the IPP. For example, if the time to remove an Existing IPP is at 12:10:00, the pre-determined period of time entered by a network administrator is one hour, and a new IPP which is identical to the Existing IPP is created at 12:45:30, then the new IPP will not be stored and instead the time to remove the Existing IPP is then updated to 13:45:29.

According to one of the embodiments of the invention, domain name of a DNNTP contains no, one or more wildcards. When the domain name of a DNNTP contains no wildcard, the host name contained in an address record DNS look-up reply must be identical to a domain name specified before one or more corresponding IPPs are created. When the domain name used in a DNNTP contains one or more wildcards, the host name does not have to be identical, but must satisfy the wildcard criteria before one or more corresponding IPP is created. For example, if a domain name in DNNTP is "?.example.com", then any host names having one character in front of "example.com", such as "a.example.com" and "3.example.com" are considered matching the wildcard criteria and corresponding IPPs are created. In another example, if a domain name in DNNTP is "*.example.com", then any host names having one or more characters in front of "example.com", such as "a.example.com", "efg.example.com" and "4april2012.example.com" are considered matching the wildcard criteria and corresponding IPPs are created. In another example, if a domain name in DNNTP is "e*a.com.*", then any host names having one or more characters between the "e" and "a" and having one or more characters after "com.", such as "a.example.com", "efg.example.com" and "4april2012.example.com" are considered matching the wildcard criteria and corresponding IPPs are created. Using wildcard for matching can be done in many ways, including the choice of characters to represent different wildcards, the use of regular expression for matching, the use of different computer languages to implement the matching. It is apparent to a skilled person in the art how to implement string matching using wildcard in computing device and/or network device.

Figure 4:
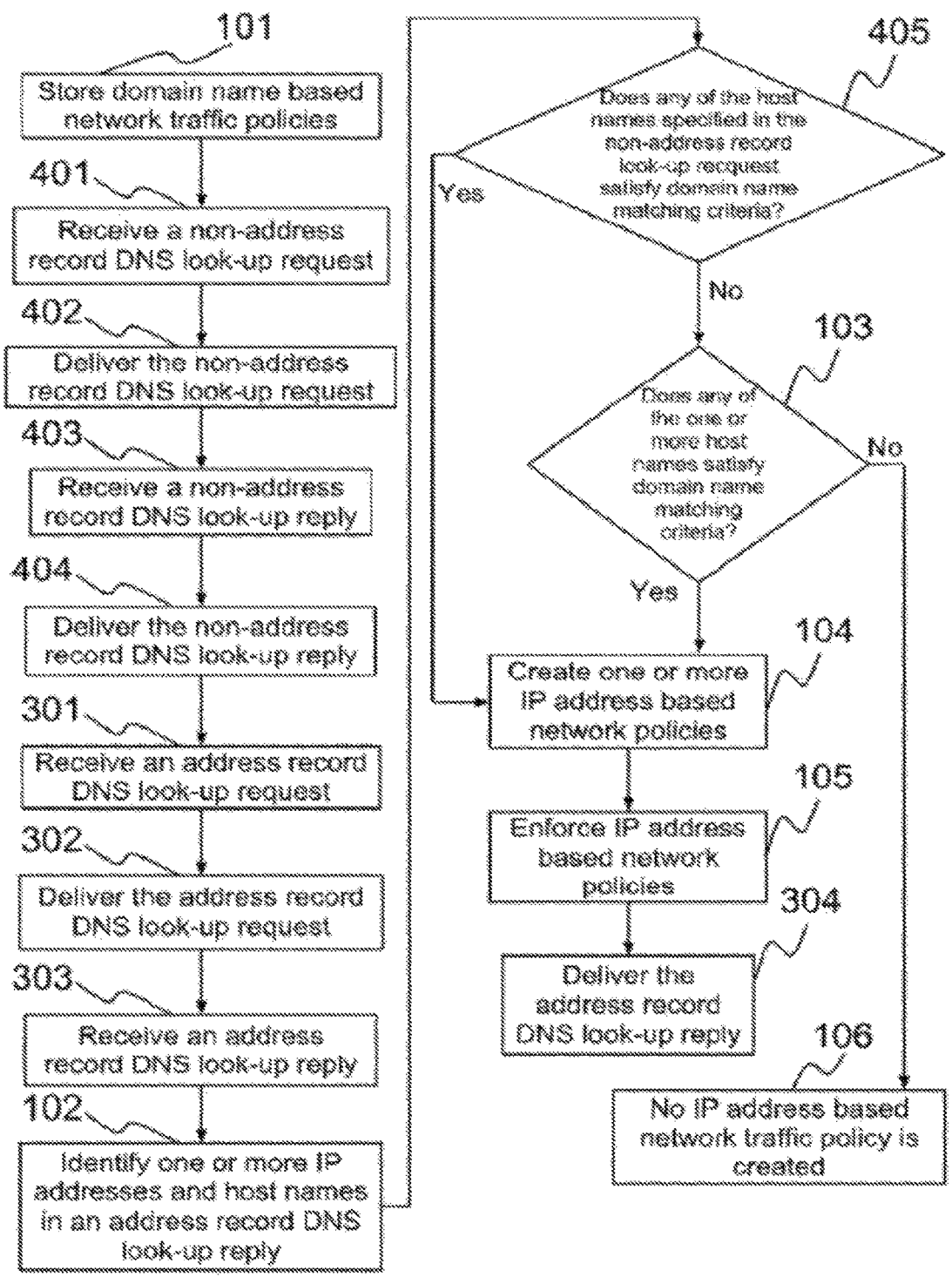
FIG. 4 is a flow chart showing the steps of creating an IP address based network policy when the DNS look-up request is non-address record type.

FIG. 4 is a flow chart illustrating one of the embodiments of the invention to create one or more IPPs when a DNS look-up request is to request for non-address record, such as mail exchange (MX) record, name server (NS) record and canonical name (CNAME) record of a domain name. The number of host names returned in an address record DNS look-up reply for non-address record may be more than one. The differences between the steps shown in FIG. 3 and FIG. 4 are the additional steps at functional block 401, functional block 402, functional block 403, functional block 404 and replacing decision block 103 with decision block 405.

For example, when a network device or computing device, which is connected to the LAN of the IPPND, tries to resolve one or more IP address of an email server of a domain name, it sends out a non-address record, such as an MX record, DNS look-up request, the IPPND will then receive a non-address record DNS look-up request from one of its LAN network interface at functional block 401. The IPPND then forwards the non-address record DNS look-up request to a DNS server or another router connected to the IPPND at functional block 402. The IPPND then receives a non-address record DNS look-up reply from the DNS server or the router at functional block 403. The non-address record DNS look-up reply should contain one or more name records if a name record is found, such as a host name of the email server. The IPPND then delivers the non-address record DNS look-up reply to the network device or computing device which originally sent out the non-address record DNS look-up request.

As the non-address DNS look-up reply may contain one or more host names and may contain no IP address, the network device or computing device may then need to resolve the IP address in relation to the host name contained in the non-address record DNS look-up reply. Therefore, functional block 301 will then be executed and followed by functional block 303 and functional block 102.

As the host name contained in the non-address record DNS look-up reply at functional block 403 may belong to a different domain name used in a DNNTP, the domain name used in non-address record look-up request, such as MX record look-up request, is used to determine whether domain name matching criteria is matched at decision block 405. Functional block 104 and functional 105 are executed if the domain name used in non-address record look-up request contains a domain name used in one or more DNNTPs, otherwise the host name used in address record look-up request is used to determine whether domain name matching criteria is matched at decision block 103. If there is a match, functional block 104 and functional 105 are executed, otherwise at functional block 106 no IPP in relation to the host name is created.

According to one of the embodiments of the invention, the IPPND resolves the IP address in relation to the host name contained in the non-address record DNS look-up reply itself by delivering a corresponding address record DNS look-up request after functional block 403 and then wait for the corresponding address record DNS look-up reply. By proactively sending out an address record DNS look-up request, the IPPND is able to resolve the corresponding IP address of the host name contained in the non-address record DNS look-up reply before receiving an address record DNS look-up request for the host name and results in earlier IPP creation if there is one. The earlier an IPP is created, the more time the IPPND can have to prepare for enforcing the IPP.

System

Figure 5:
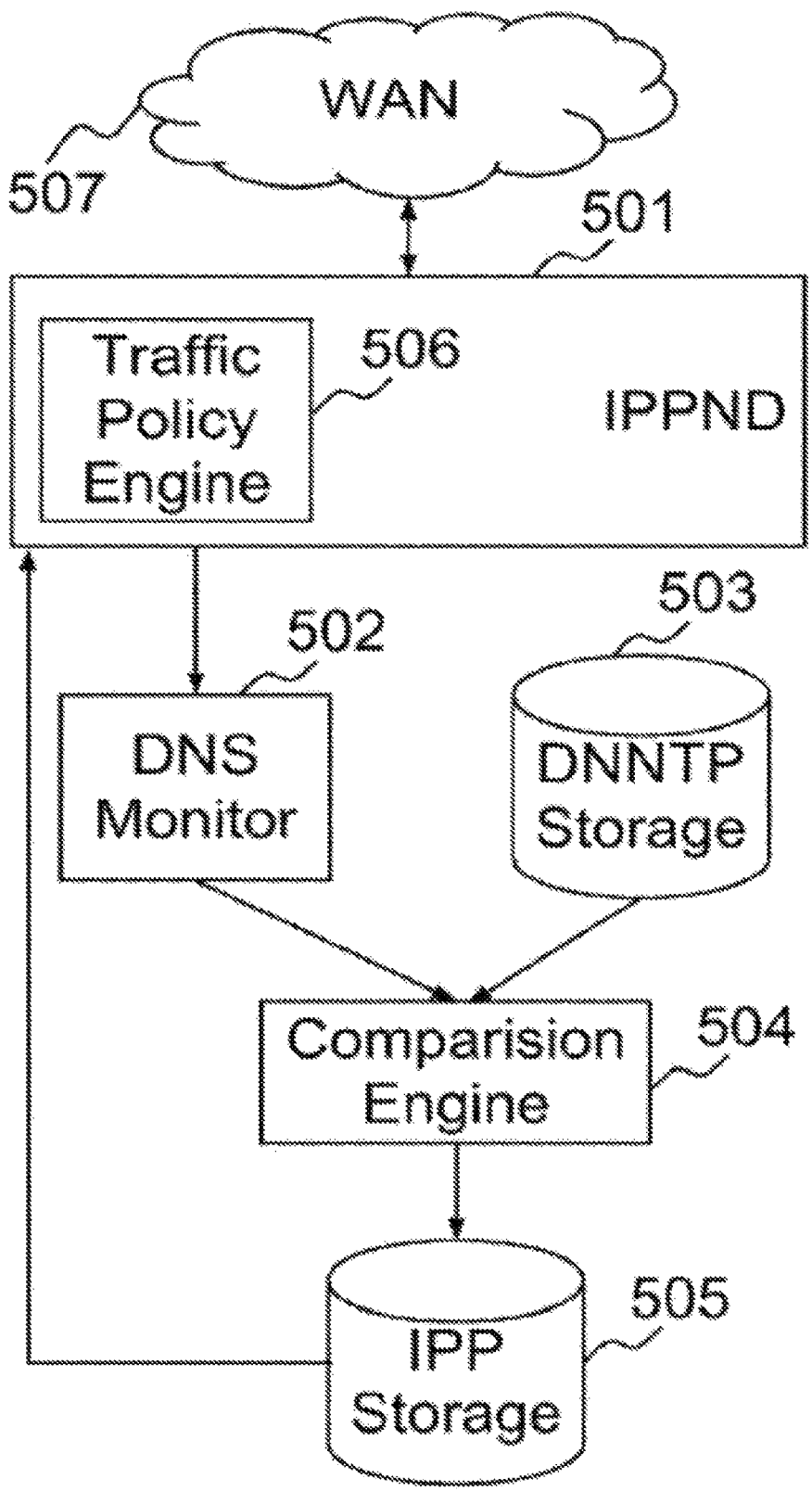
FIG. 5 is a system-level block diagram of a network system showing the components, involved in creating and enforcing an IP address network policy using a domain name.

FIG. 5 is a system diagram illustrating a system for creating IPP by using domain name. The arrows in FIG. 5 are data flow. IPPND 501 has one or more network interfaces, and one or more processing units to receive, route and/or send traffic from its LAN to its WAN 507 and vice versa. The network interfaces of IPPND 501 can be implemented by using Ethernet, USB, Firewire, Thunderbolt, antenna or any other interfaces capable of transmitting and receiving data. The processing units of IPPND 501 can be implemented by a CPU, network processor, microprocessor or any device which are capable of processing instructions.

According to one of the embodiments of the invention, network policy engine 506 is a processing unit inside IPPND 501 and is used to enforce network policy, including IPP. Network policy engine 506 can be implemented by a CPU, network processor, microprocessor or any device which are capable of processing instructions and enforcing network policy. In one implementation, network policy engine 506 is a standalone network device, is capable of enforcing network policy and route traffic from its LAN to its WAN and vice versa and communicates with IPPND 501 through datagram, packet, bus, OSI layer 2, OSI layer 3, Ethernet, IP, and/or any other communications protocols.

DNS monitor 502 is used to identify network traffic that is a Domain Name System look-up reply. DNS monitor 502 can be a standalone network device or part of IPPND 501. When DNS monitor 502 is a standalone network device, DNS monitor 502 communicates with IPPND 501 through datagram, packet, bus, OSI layer 2, OSI layer 3, Ethernet, IP, and/or any other communications protocols. According to one of the embodiments of the invention, DNS monitor 502 can be implemented by using processing units and network interfaces of IPPND 501.

When IPPND 501 receives network traffic from one of its network interfaces, DNS monitor 502 identifies network traffic belonging to address record and non-address record DNS look-up request and reply. When DNS monitor 502 is a standalone network device, IPPND 501 mirrors the network traffic to DNS monitor 502 through a network interface. When DNS monitor 502 is part of IPPND 501, the processing unit of DNS monitor 502 monitors the network traffic receiving from network interfaces of IPPND 501. DNS monitor 502 identifies address record DNS look-up reply by examining the payload of the network traffic.

When DNS monitor 502 has identified an address record DNS look-up reply, DNS monitor 502 forwards the address record DNS look-up reply to comparison engine 504. Comparison engine identifies one or more host names and corresponding one or more IP addresses in the address record DNS look-up reply and then checks if any of the one or more host names contain one of the domain names used in one or more DNNTPs. DNNTP is provided by DNNTP storage 503. Comparison engine 504 can be a standalone network device, a computing device or part of IPPND 501. When comparison engine 504 is a standalone network device, comparison engine 504 can be implemented by a CPU, network processor, microprocessor or any device which are capable of processing instructions and communicates DNS with monitor 502 through datagram packet, bus, OSI layer 2, OSI layer 3. Ethernet, IP, and/or any other communications protocols. When comparison engine 504 is part of IPPND 501, DNS monitor 502 should also be part of IPPND 501 and can be implemented by using processing units and network interfaces of IPPND 501.

DNNTP storage 503 can be a standalone storage or part of IPPND 501. When DNNTP storage 503 is a standalone storage, DNS monitor 502 communicates with IPPND 501 through datagram, packet, bus, OSI layer 2, OSI layer 3, Ethernet, IP, and/or any other communications protocols, and can store DNNTP using random access memory, read only memory, static memory, non-volatile memory, magnetic storage medium, optical storage medium or any storage medium. When DNNTP storage 503 is part of IPPND 501, DNNTP storage 503 can be implemented by using storage medium of IPPND 501. The storage medium of IPPND 501 can be implemented by using random access memory, read only memory, static memory, non-volatile memory, magnetic storage medium, optical storage medium or any storage medium.

When comparison engine 504 determines that one or more host names are used in one of the domain names used in one or more DNNTPs, one or more corresponding IPPs are then created. For example, if a DNNTP of domain name "www.example.com" retrieved from DNNTP storage 503 is to route all network traffic to domain name "www.example.com" through a specific WAN network interface and if the identified host name and IP address of a DNS look-up reply provided by DNS monitor 202 are "video.example.com" and 123.123.123.123 respectively, then an IPP to route all network through the specific WAN interface for IP address 123.123.123.123 is then established. If the identified host name and IP address of another DNS look-up reply are "mail.example.com" and 123.123.123.124 respectively, then another IPP to route all network through the specific WAN interface for IP address 123.123.123.124 is then also established. Therefore, there are two IPPs established for domain name "example.com" after the two DNS look-up replies are received.

When comparison engine 504 determines that none of the host names are used in any of the domain names used in the DNNTP, there is no IPP to be created and stored.

The IPP established is then stored at IPP storage 505 for network policy engine 506 to use. IPP storage 505 can be a standalone storage or part of IPPND 501. When IPP storage 505 is a standalone storage, IPP storage 505 communicates with IPPND 501 through datagram, packet, bus, OSI layer 2, OSI layer 3, Ethernet, IP, and/or any other communications protocols, and can store IPP using random access memory, read only memory, static memory, non-volatile memory, magnetic storage medium, optical storage medium or any storage medium. When IPP storage 505 is part of IPPND 501, IPP storage 505 can be implemented by using storage medium of IPPND 501.

Enforcement engine 506 then enforces one or more IPPs provided by IPP storage 505 against network traffic.

According to one of the embodiments, DNS monitor 502, DNNTP storage 503, comparison engine 504 and IPP storage 505 are implemented in one single device, such as a computational device and network device, and IPPND 501 and network policy engine 506 are not implemented in that single device. This allows the network device IPP management be separated from the enforcement of IPP.

According to one of the embodiments, DNS monitor 502, DNNTP storage 503, comparison engine 504, IPP storage 505 and network policy engine 506 are all implemented in IPPND 501. When a network device or computing device, which is connected to the LAN of the IPPND 501, tries to resolve one or more IP address of a host name by sending out an address record DNS look-up request, IPPND 501 will then receive the address record DNS look-up request from one of its LAN network interfaces. As IPPND 501 cannot resolve the IP address, IPPND 501 then forwards the address record DNS look-up request to a DNS server or another router connected to one of the WAN interfaces. IPPND 501 will then receive the address record DNS look-up reply from the DNS server or the router. DNS monitor 502, DNNTP storage 503, and comparison engine 504 will then establish one or more IPPs if any of the host names contains the domain names used in one or more DNNTPs.

According to one of the embodiments of the invention, IPPND 501 delivers the address record DNS look-up reply after one or more IPPs have been created. If the DNS look-up request is originated from a computing device or a network device connected to the LAN of IPPND 501, the computing device or the network device waits for the DNS look-up reply from IPPND 501 in order to resolve the IP address of the host name before sending out network traffic to that IP address. Therefore, the one or more IPP should be created before IPPND delivering the address record DNS look-up reply to ensure that IPPND 501 has adequate time to enforce policy routing in relation to that domain name. If there is not adequate time for an IPP to be created for policy routing enforcement, it is possible that network traffic originated from the LAN of IPPND 501 has violated policy routing even the IP address of the host name has been resolved.

According to one of the embodiments of the invention, an IPP created is removed from IPP storage 505 and not available for enforcement after a pre-determined period of time. A timer at IPP storage 505 can be used to record the time when an IPP should be removed when IPP storage 505 is a standalone device and has processing instruction capability. When IPP storage 505 is part of IPPND SOL the timer can be implemented by using processing units of IPPND 501. Multiple timers are needed if there are multiple IPPs created. A timer can be implemented by using random access memory, read only memory, static memory, non-volatile memory, magnetic storage medium, optical storage medium or any storage medium. According to one of the embodiments of the invention, the pre-determined period of time is determined by a network administrator. According to one of the embodiments of the invention, the, pre-determined period of time is hard coded at IPPND 501. According to one of the embodiments of the invention, the pre-determined period-of-time for IPP storage 505 to remove the IPP is determined by a TTL associated with every record in a DNS look-up reply. If the pre-determined period of time is too short. IPPND 501 may not be able to enforce DNNTP as the corresponding IPP has already been removed from IPP storage 505. If the pre-determined period of time is too long, IPPND 501 may use incorrect IP address to enforce DNNTP as the corresponding IPP contains an outdated IP address.

According to one of the embodiments of the invention, when a new IPP which is identical to another Existing IPP having been stored in IPP storage 505 is created, there is no need to store the new IPP at IPP storage 505, instead, the time to remove Existing IPP is then updated according to the pre-determined period of time of removing the IPP. For example, if the time to remove an Existing IPP from IPP storage 505 is at 12:10:00, the pre-determined period of time entered by a network administrator is one hour, and a new IPP which is identical to the Existing IPP is created at 12:45:30, then the new IPP will not be stored and instead the time to remove the Existing IPP from IPP storage 505 is then updated to 13:45:29.

According to one of the embodiments of the invention, comparison engine 504 is capable of handling one or more wildcards contained in a domain name of a DNNTP. Comparison engine 504 can implement one or more wildcard matching algorithms to create one or more IPPs for a DNNTP when a host name matches one or more domain names, which contain one or more wildcards, of a DNNTP.

According to one of the embodiments of the invention, comparison engine 504 may create one or more IPPs when a DNS look-up request is to request for non-address record, such as MX record, NS record and CNAME record of a domain name as the number of host names returned in DNS look-up reply for non-address record may be more than one. DNS monitor 502 identifies and mirrors DNS look-up related message to Comparison Engine 504 for comparison and one or more IPPs creation.

For example, when a network device or computing device, which is connected to the LAN of IPPND 501, tries to resolve one or more IP addresses of an email server of a domain name, it sends out a non-address record, such as an MX record, DNS look-up request. IPPND 501 will then receive a non-address record DNS look-up request from one of its LAN network interface at functional block 401. IPPND 501 then forwards the non-address record DNS look-up request to a DNS server or another router connected to IPPND 501. IPPND 501 then receives a non-address record DNS look-up reply from the DNS server or the router. The non-address record DNS look-up reply should contain a name record if a name record found, such as a host name of the email server. IPPND 501 then delivers the non-address record DNS look-up reply to the network device or computing device which originally sent out the non-address record DNS look-up request.

As the non-address DNS look-up reply may contain one or more host names and may contain no IP address, the network device or computing device may then need to resolve the IP address in relation to the host name contained in the non-address record DNS look-up reply. Therefore, IPPND 501 will then receive an address record DNS look-up request from one of its LAN network interfaces. As IPPND 501 cannot resolve the IP address, IPPND 501 then forwards the address record DNS look-up request to a DNS server or another router connected to one of the WAN interfaces. IPPND 501 will then receive an address record DNS look-up reply from the DNS server or the router. DNS monitor 502. DNNTP storage 503, and comparison engine 504 will then create one or more IPPs if any of the one or more host names contain one of the domain names used in one or more DNNTPs.

It is possible that a host name contained in the non-address record DNS look-up reply does not contain the same domain name used in the DNNTP. For example, there is a DNNTP in relation to domain name "gmail.com". After an non-address record DNS look-up request for MX record of domain name "gmail.com" is received from a laptop connected to the LAN of IPPND 501 and is sent to a DNS server, the non-address record DNS look-up reply, which may contain the host name "gmail-smtp-in.1.google.com", is received by a WAN interface of IPPND 501. IPPND 501 would then forward the non-address record DNS look-up reply to the laptop. The laptop will then send out an address record DNS look-up request containing host name "gmail-smtp-in.1.google.com" to a DNS server through IPPND 501. Once the IP address of host name "gmail-smtp-in.1.google.com" has been resolved by the DNS server, an address record DNS look-up reply with IP address, for example, "74.125.53.26" will be sent to the laptop from IPPND 501. Comparison Engine 504 will create an IPP with the IP address "74.125.53.26" for the "gmail.com" DNNTP, even though the host name "gmail-smtp-in.1.google.com" of IP address "74.125.53.26" does not contain the domain name "gmail.com". Comparison engine 504 is able to create the IPP based on the chains of DNS look-up messages provided by DNS Monitor 502.

In another embodiment, IPPND 501 resolves the IP address in relation to the host name contained in the non-address record DNS look-up reply itself by delivering a corresponding address record DNS look-up request after receiving a non-address record DNS look-up reply and then wait for the corresponding address record DNS look-up reply. By proactively sending out an address record DNS look-up request, IPPND 501 is able to resolve the corresponding IP address of the host name contained in the non-address record DNS look-up reply before receiving an address record DNS look-up request for the host name and results in earlier IPP creation if there is one. The earlier an IPP is created, the more time network policy engine 506 can have to prepare for enforcing the IPP.

The invention claimed is:

1. A method for creating Internet Protocol address based network policy (IPP) at a network device, comprising the steps of:

a. retrieving one or more domain name-based network policies (DNNTPs) stored at a server; wherein the DNNTPs contain one or more domain names of traffic destination and parameters selected from a group consisting of address of source traffic, protocol and algorithm; wherein the DNNTPs are used by the network device to regulate routing;
b. monitoring network traffic for an address record Domain Name System (DNS) look-up reply corresponding to the one or more domain names of traffic destination;
c. identifying one or more host names and corresponding one or more IP addresses in the address record DNS look-up reply;
d. creating one or more IPPs corresponding to the DNNTPS when any of the one or more host names contain one of the domain names used in the one or more DNNTPs;
e. storing the one or more IPPs; wherein the IPP contains parameters selected from a group consisting of the address of source traffic, one or more IP addresses of traffic destination, protocol, and algorithm;
f. enforcing the one or more IPPs on routing network traffic based on Internet Protocol (IP) address of the network traffic;
g. when more than one IPP is created for a first IP address, enforcing an IPP with higher priority on network traffic with the first IP address; and
h. removing the one or more IPPs from storage after a predetermined period of time;
wherein the predetermined period of time is based on a time to live (TTL) associated with the address record DNS look-up reply;
wherein an IP address, the IP address range, or the Ethernet address is the address of source traffic;
wherein a transmission control protocol or user datagram protocol and port numbers serve as protocols;
wherein a classification of weight balance, least used, lowest latency or priority make up the algorithm; and
wherein the one or more IP address-based network policies change when the domain name of a DNNTP is changed respectively.

2. The method of claim 1, further comprising:
i. removing the one or more IPP when the TTL of the one or more IPP is about to expire; and
wherein the TTL is based on the address record DNS look-up reply.

3. The method of claim 2, further comprising:
j. updating the TTL for the removal the IP address according to the network-based policies; and
k. not storing the one or more IPP if it is determined that the one or more IPP identical to an IPP already exists in the storage.

4. The method of claim 1, further comprising:
i. identifying one or more host names and corresponding one or more IP addresses in the address record DNS look-up reply; and
j. verifying if any of the one or more host names contain one of the domain names used in one or more DNNTPs.

5. The method of claim 1, wherein a domain name used in a DNNTP contains, one or more wildcards or no wildcards;
wherein the address record DNS look-up reply contains a host name;
wherein the host name must be identical to a domain name specified before one or more corresponding IPPs are created when there is no wildcard; and
wherein the host name satisfies wildcard criteria before one or more corresponding IPPs are created when there are one or more wildcards.

6. The method of claim 1, further comprising the steps of:
i. forwarding an address record DNS look-up request received; and
j. forwarding the address record DNS look-up reply received.

7. The method of claim 6, further comprising the steps of:
k. forwarding a non-address record DNS look-up request received; and
l. forwarding a non-address record DNS look-up reply received.

8. The method of claim 7, further comprising the step of:
m. determining whether the non-address record comprises a domain name used in one or more DNNTPs; and
wherein the non-address record is canonical name record, a mail exchange record, a name server record, a service locator or a text record.

9. The method of claim 8, further comprising the step of
n. determining whether a domain name used in one or more domain name-based network policies contains one or more host names while creating one or more IP addresses based on network policies.

10. The method of claim 1 wherein the one or more IPPs are stored at a server.

11. A system for creating Internet Protocol address based network policy (IPP) at a network device, comprising:
one or more network interfaces;
one or more processing units;
one or more storage units storing program instructions and one or more domain name-based network policies (DNNTPs), wherein the program instructions are configured to cause, when execute by the one or more processing units, the one or more processing units to perform:
a. retrieving one or more domain name-based network policies (DNNTPs) stored at a server; wherein the DNNTPs contain one or more domain names of traffic destination and parameters selected from a group consisting of address of source traffic, protocol and algorithm; wherein the DNNTPs are used by the network device to regulate routing;
b. monitoring network traffic for an address record Domain Name System (DNS) look-up reply corresponding to the one or more domain names of traffic destination;
c. identifying one or more host names and corresponding one or more IP addresses in the address record DNS look-up reply;
d. creating one or more IPPs corresponding to the DNNTPS when any of the one or more host names contain one of the domain names used in the one or more DNNTPs;
e. storing the one or more IPPs; wherein the IPP contains parameters selected from a group consisting of the address of source traffic, one or more IP addresses of traffic destination, protocol, and algorithm;
f. enforcing the one or more IPPs on routing network traffic based on Internet Protocol (IP) address of the network traffic;
g. when more than one IPP is created for a first IP address, enforcing an IPP with higher priority on network traffic with the first IP address;
h. removing the one or more IPPs from storage after a predetermined period of time; wherein the predetermined period of time is based on a time to live (TTL) associated with the address record DNS look-up reply;

wherein an IP address, the IP address range, or the Ethernet address is the address of source traffic;

wherein a transmission control protocol or user datagram protocol and port numbers serve as protocols;

wherein a classification of weight balance, least used, lowest latency, or priority make up the algorithm; and wherein the one or more IP address-based network policies change when the domain name of a DNNTP is changed respectively.

12. The system of claim 11, wherein the program instructions are configured to cause, when executed by the one or more processing units, the one or more processing units to perform:

i. removing the one or more IPP when the TTL of the one or more IPP is about to expire; and wherein the TTL is based on the address record DNS look-up reply.

13. The system of claim 12, wherein the program instructions are configured to cause, when executed by the one or more processing units, the one or more processing units to perform:

j. updating the TTL for the removal the IP address according to the network-based policies; and k. not storing the one or more IPP if it is determined that the one or more IPP identical to an IPP already exists in the one or more storage units.

14. The system of claim 11, wherein the program instructions are configured to cause, when executed by the one or more processing units, the one or more processing units to perform:

i. identifying one or more host names and corresponding one or more IP addresses in the address record DNS look-up reply; and j. verifying if any of the one or more host names contain one of the domain names used in one or more DNNTPs.

15. The system of claim 11, wherein the one or more storage units store domain name used in a DNNTP containing one or more wildcards or no wildcards;

wherein the address record DNS look-up reply contains a host name;

wherein the host name must be identical to a domain name specified before one or more corresponding IPPs are created when there is no wildcard; and wherein the host name must satisfy wildcard criteria before one or more corresponding IPPs are created when there are one or more wildcards.

16. The system of for claim 11, wherein the program instructions are configured to cause, when executed by the one or more processing units, the one or more processing units to perform:

i. forwarding an address record DNS look-up request received; and j. forwarding the address record DNS look-up reply received.

17. The system of claim 11, wherein the program instructions are configured to cause, when executed by the one or more processing units, the one or more processing units to perform:

i. forwarding a non-address record DNS look-up request received; and j. forwarding a non-address record DNS look-up reply received.

18. The system of claim 17, wherein the proram instructions are configured to cause, when executed by the one or more processing units, the one or more processing units to perform:

k. determining whether the non-address record comprises a domain name used in one or more domain name-based network policies; and wherein the non-address record is a canonical name record, a mail exchange record, a name server record, a service locator, or a text record.

19. The system of claim 11, wherein the program instructions are configured to cause, when executed by the one or more processing units, the one or more processing units to peform:

i. determining whether a domain name used in one or more DNNTPs contains one or more host names while creating one or more IP addresses based on network policies.

20. The system of claim 11, wherein the one or more IPPs are stored at a server.

* * * * *